United States Patent
Richards

(10) Patent No.: US 7,040,574 B2
(45) Date of Patent: May 9, 2006

(54) AIRCRAFT AND WATERCRAFT ADAPTED TO FLOAT ON MAIN WING

(76) Inventor: Ray Richards, 37 Gardiner Drive, Ajax, Ontario (CA) L1S 5Y4

( * ) Notice: Subject to any disclaimer, the term of this patent is extended or adjusted under 35 U.S.C. 154(b) by 0 days.

(21) Appl. No.: 10/854,148

(22) Filed: May 27, 2004

(65) Prior Publication Data

US 2006/0060701 A1    Mar. 23, 2006

Related U.S. Application Data

(63) Continuation of application No. 10/050,591, filed on Jan. 18, 2002, now abandoned.

(30) Foreign Application Priority Data

Jan. 19, 2001    (CA) .................................. 2331944

(51) Int. Cl.
*B64C 35/00*    (2006.01)

(52) U.S. Cl. ...................... 244/105; 114/272

(58) Field of Classification Search ............... 244/105, 244/106, 47; 114/272, 273
See application file for complete search history.

(56) References Cited

U.S. PATENT DOCUMENTS

| | | | |
|---|---|---|---|
| 1,471,656 A | 10/1923 | Hall | |
| 3,190,582 A | 6/1965 | Lippisch | |
| 3,599,903 A | 8/1971 | Handler | |
| 4,484,721 A | 11/1984 | Gue | |
| 4,962,978 A | * 10/1990 | Weston | ............... 244/105 |
| 5,065,833 A | 11/1991 | Matsuoka et al. | |
| 5,136,961 A | 8/1992 | Follett | |
| 5,415,365 A | 5/1995 | Ratliff | |
| 5,622,133 A | 4/1997 | Sinitsyn et al. | |
| 6,042,052 A | 3/2000 | Smith | |
| 6,113,028 A | 9/2000 | Lohse et al. | |
| 6,264,136 B1 | 7/2001 | Weston | |
| 6,290,174 B1 | 9/2001 | Gioia | |
| 2002/0096600 A1 | 7/2002 | Richards | |

FOREIGN PATENT DOCUMENTS

| | | |
|---|---|---|
| CA | 2071527 | 6/1991 |
| WO | WO95/00386 | 1/1995 |

OTHER PUBLICATIONS

"Lancier 400 on the Numbers." Plane and Pilot, p. 12.
Stinton, D. "Aero-Marine Design and Flying Qualities of Floatplane and Flying Boats." Aeronautical Journal, Mar. 1987, p. 97-127.
Weiss, Arturo, "Ruski Floatski", [Online] Jan. 21, 2002, Retrieved from the Internet: avweb.com.
Plane & Pilot Editors, "Hope Floats", Plane & Pilot Magazine, 2001, p. 12.

* cited by examiner

*Primary Examiner*—Peter M. Poon
*Assistant Examiner*—Timothy D. Collins
(74) *Attorney, Agent, or Firm*—Bereskin & Parr

(57) ABSTRACT

An aircraft has a fuselage, one or more propellers and a main wing. The wing has a central portion located beneath the fuselage and distal portions, which extend outwardly from opposite sides of the fuselage. The wing floats on water when the aircraft is stationary and maintains the fuselage above and out of the water. The aircraft optionally has a tail having a horizontal stabilizer, which provides additional support to the fuselage to maintain it out of water. The structure of the aircraft can be adapted for use as a watercraft by reducing the length of the wing.

25 Claims, 5 Drawing Sheets

AIRCRAFT AND WATERCRAFT ADAPTED TO FLOAT ON MAIN WING

CROSS-REFERENCE TO RELATED APPLICATION

This application is a continuation of the application having Ser. No. 10/050,591 filed Jan. 18, 2002 Now ABN.

BACKGROUND OF THE INVENTION

This invention relates to watercraft and aircraft and more particularly to a watercraft and aircraft in which a main wing supports the cabin in the case of a watercraft and supports the fuselage in the case of an aircraft when the aircraft is in water.

Various flotation means are used to support a seaplane when it is on water. The most usual means are floats or pontoons but in some aircraft such as flying-boats, a portion of their fuselage as well as outboard floats are used to support them on water.

The pontoons and floats of conventional float-planes detrimentally affect the operation of the craft in a number of ways: first the pontoons and floats constitute a substantial aerodynamic drag when the aircraft is taking off and when the aircraft is in the air and secondly the air speed of the aircraft and its fuel efficiency are detrimentally affected by such drag.

Flying-boats, which are supported by their fuselage as well as by pontoons and floats, also have substantial drag due to the floats attached to their wings. There is however another source of drag which is due to so called "shed-vortex" drag associated with the hydrodynamic "step" located on the bottom of their fuselages.

The step allows the aircraft to break water suction forces and to become "unstuck" and to lift off the water once sufficient speed has been attained. As much as 50 percent of the overall drag of a standard flying-boat or a float-plane is attributable to the shed-vortex drag of this step.

SUMMARY OF THE INVENTION

I have designed a seaplane that can be supported on water by its main wing and optionally by the horizontal stabilizer of its tail. The fuselage of the aircraft is completely or substantially completely out of the water. When the craft has sufficient forward speed in water, the main wing begins to plane on its lower surface and continues planing until lift-off occurs at the appropriate speed. The horizontal stabilizer and the remainder of the tail of the aircraft are out of the water at this time.

My design can be applied to a watercraft simply by trimming the length of the main wing. The resulting wing adds stability to the watercraft so that it can attain relatively high speeds on water without loss of stability.

My seaplane lacks the "step" of a conventional flying-boat and float-plane. The fuselage is not a hull providing flotation but simply provides support for the cabin, main wing and horizontal and vertical stabilizers. The aft portion is well clear of the water and rotation at takeoff speed does not place any part of the fuselage in the water. The trailing edge of the root of the main wing serves the same function as the step but without an aerodynamic drag beyond that normally provided by the wing.

The structure of my seaplane is much simpler than that of a conventional flying-boat. Since its fuselage is completely out of the water, no special hydrodynamic shapes are needed such as in flying-boats for operation on water. As a result there is much less overall aerodynamic drag of my fuselage when in flight than that of conventional flying-boats.

Broadly, my seaplane comprises a fuselage and propulsion means such as one or more propellers. The main wing of the aircraft has a central portion located beneath the fuselage and distal portions which extend outwardly from opposite sides of the fuselage. My seaplane optionally has a tail which includes a horizontal stabilizer. The stabilizer as well as the main wing are adapted to float on water when the aircraft is stationary. The seaplane is designed to provide not only static stability on the water but also hydrodynamic stability while hydroplaning on the water, taking off from the water and landing on water.

The watercraft of my invention includes a cabin and propulsion means such as one or more propellers. The watercraft has a main wing which has a central portion located beneath the cabin and distal portions which extend outwardly from opposite sides of the cabin. My watercraft optionally has a tail, which includes a horizontal stabilizer. The watercraft is designed to provide not only static stability on the water but also hydrodynamic stability while hydroplaning on the water.

The following discussion is related to a seaplane but it is to be understood that much of the discussion is applicable to the watercraft of my invention.

For hydrodynamic longitudinal pitch stability, the centre of gravity of the seaplane must be at or aft of the centre of hydrodynamic pressure during the take-off run and while landing. The centre of hydrodynamic pressure ("CHP") is the point on the planing surface of the wing where all hydrodynamic forces can be considered to be concentrated.

It is well known and understood by float plane and flying boat designers that the further the centre of gravity of the craft is ahead or forward of the CHP, the more the craft is prone to a phenomenon known as "porpoising". Porpoising can induce a violent oscillation in pitch and can result in loss of control and even overturning of the craft. The centre of gravity of such craft is located at the CHP during hydroplaning to minimize the chance of porpoising. Preferably the centre of gravity of my seaplane is located at the trailing edge of the wing root chord. Since the only hydrodynamic planing surface is the underside of the wing centred on the root chord, the CHP can only be located at or ahead of the centre of gravity while hydroplaning. This means only nose-up (and not nose-down) pitching moments can be generated hydrodynamically and these are relatively small since the chip is not far from the centre of gravity on landing or take-off, from the trailing edge of the root chord of the wing.

With the centre of gravity located at the trailing edge of the root chord of the floatwing, the aerodynamic centre ("AC") must be located aft of this point for aerodynamic longitudinal pitch stability. One way of doing so is to increase the size of the horizontal tail surface area (and thereby the so-called "tail volume") which has the effect of pulling the AC (so-called "neutral point") of the entire aircraft further aft behind the centre of gravity. Therefore by having a large tail volume and locating the centre of gravity at the trailing edge of the root wing chord, and with the CHP always at or ahead of the centre of gravity, both hydrodynamic and aerodynamic stability is achieved and ensured with the floatwing design.

A second possible configuration is the canard configuration where the horizontal stabilizer is located at the front of the aircraft and is attached at midpoint to a pylon, which connects it to the underside of the fuselage at the nose of the aircraft. The main wing would be located aft of this canard wing and it and the canard would provide flotation as before. The length of the pylons of both wings would be such that the fuselage of the aircraft would sit essentially level or slightly nose-over in the water while floating and only the main wing would hydroplane as before during takeoff and landing.

Another method of positioning the AC behind the centre of gravity is to use a "joined wing" configuration. The aircraft is essentially a biplane which is jointed at the wing tips with vertical fins and with one wing swept forward and one swept back. This places the AC at about the midpoint of the planforms of both wings. The centre of gravity is still located at the trailing edge of the wing root chord of the lower wing, which hydroplanes as before. The AC is adjusted slightly aft of this position by the addition of a relatively small horizontal tailplane. This configuration has the advantage of large lift capability due to the increased wing area. Other configurations are possible but the essential idea, for whatever configuration is used, is that the centre of gravity be located at or very near the CHP of the craft during hydroplaning operation.

My seaplane offers hydrodynamic stability in the water by keeping its centre of gravity in the correct location relative to the CHP for safe and easily controlled hydroplaning and at the same time, allows the achievement of longitudinal pitch stability in its aerodynamics even when its centre of gravity is located in the plane of the trailing edge of the main wing.

Preferably, my seaplane has a centre of gravity located on a vertical line which extends upwardly from the trailing edge of the main wing and which passes through the fuselage.

The horizontal stabilizer of my seaplane is composed of two sections each extending outwardly from opposite sides of the fuselage and each having an elevon which pivot independently of each other.

A preferred feature of the main wing is that it has a dihedral shape. Its lower wall is made up of two plane faces, which meet beneath the fuselage at an obtuse angle. The line of intersection of the two plane faces is generally referred to as a "root". The wing is symmetrically disposed about the fuselage and its dihedral angle is about 10 to about 20 degrees, preferably 15 degrees. The wing is thus "V" shaped in cross-section.

The "V" shape provides a water-planing surface for aircraft at planing speeds in exactly the same way that a "V" hull of a motorboat does. The "V" hull is known to provide the smoothest ride in rough water over other shapes. The bottom surface of the main wing therefore provides the only hydrodynamic surface required for water-planing at high speed and it does this without any compromise in the required aerodynamic shape of the main wing.

A "V" shape provides the lowest drag possible and permits the aircraft to execute sharp, banked turns while in the water, in most cases, as easily as a motor boat.

Another preferred feature of the main wing is that it is formed as a single piece and lacks aerodynamic drag-producing devices such as pontoons, wing-mounted lateral-stabilizing floats, special shaped hulls and the additional hydrodynamic "step" common to standard flying-boats. As a result the wing has a significantly lower overall aerodynamic drag coefficient, is lighter, more watertight and cheaper of construction than conventional wings.

The trailing edge of the main wing at the root provides a high-speed planing surface and in effect is a so-called "step" for my seaplane. This step provides a sharp discontinuity to utilize the Coanda effect to break water suction forces and hence to allow rotation at takeoff speed and subsequent flight. Utilizing the trailing edge of the main wing in this way eliminates the need to provide an additional step as required in traditional flying-boats which suffer the attendant aerodynamic drag losses.

BRIEF DESCRIPTION OF THE DRAWINGS

A preferred embodiment of the water- and aircraft of my invention is described with reference to the accompanying drawings in which.

Like reference characters refer to like parts throughout the description of the drawings.

DETAILED DESCRIPTION OF THE INVENTION

Figure 1:
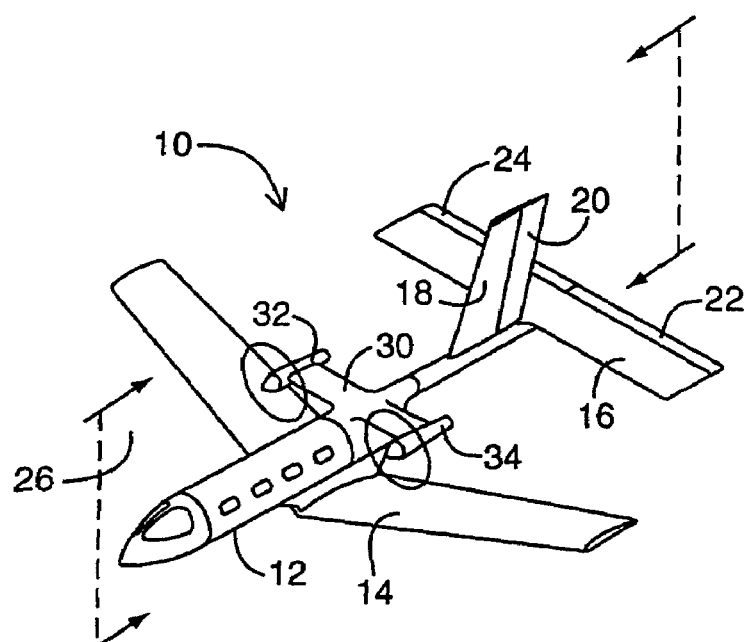
FIG. 1 is an elevation of the aircraft or seaplane of my invention.

With reference to FIG. 1, the seaplane of the invention, generally 10, has a fuselage 12, a main wing 14 and a tail having a horizontal stabilizer 16 and a vertical stabilizer 18. The vertical stabilizer has a rudder 20 while the horizontal stabilizer has two elevons 22,24 disposed side by side and on opposite sides of the plane of symmetry 26 of the aircraft.

Mounted on the top of the fuselage is a stub wing 30 and at the ends of the wing, engines 32, 34 are mounted. The stub wing optionally has control surfaces with blown flaps. The flaps are located in the slipstream of the propellers and serve to enhance lift of the aircraft when traveling at relatively low speed.

Figure 2:
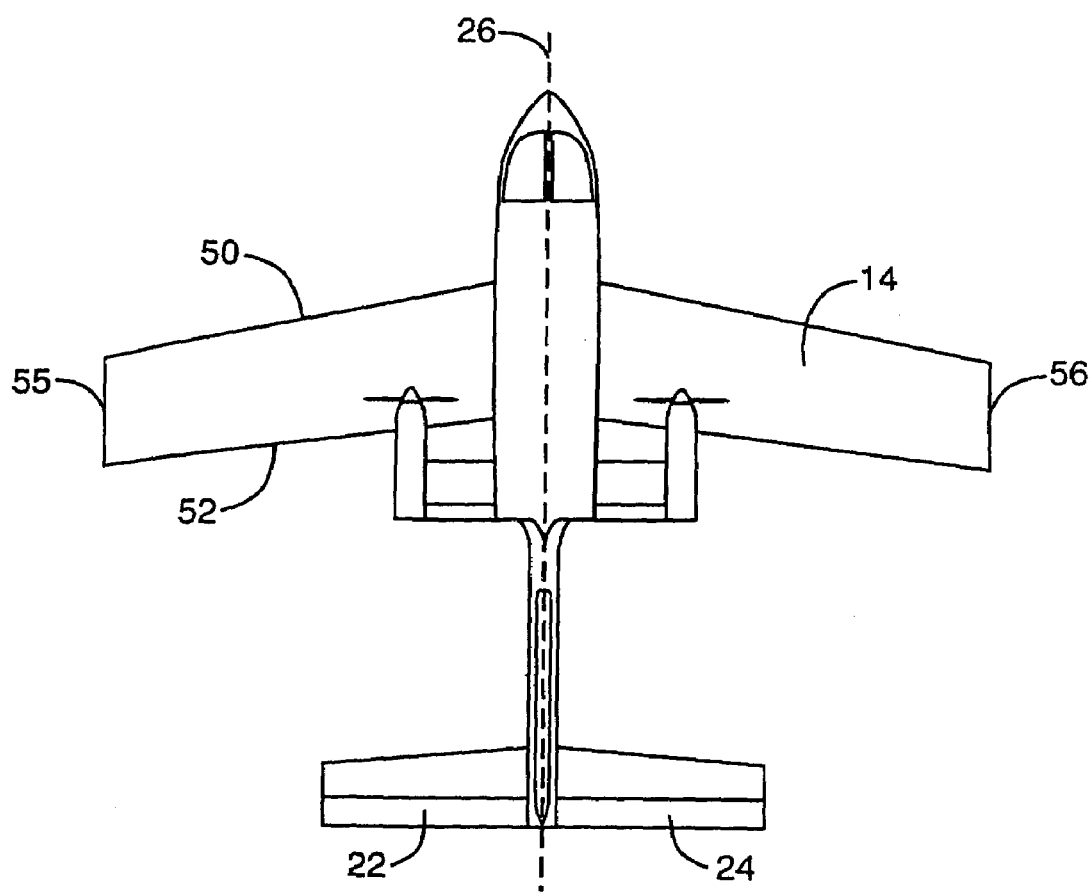
FIG. 2 is a plan view of the seaplane.
Figure 3:
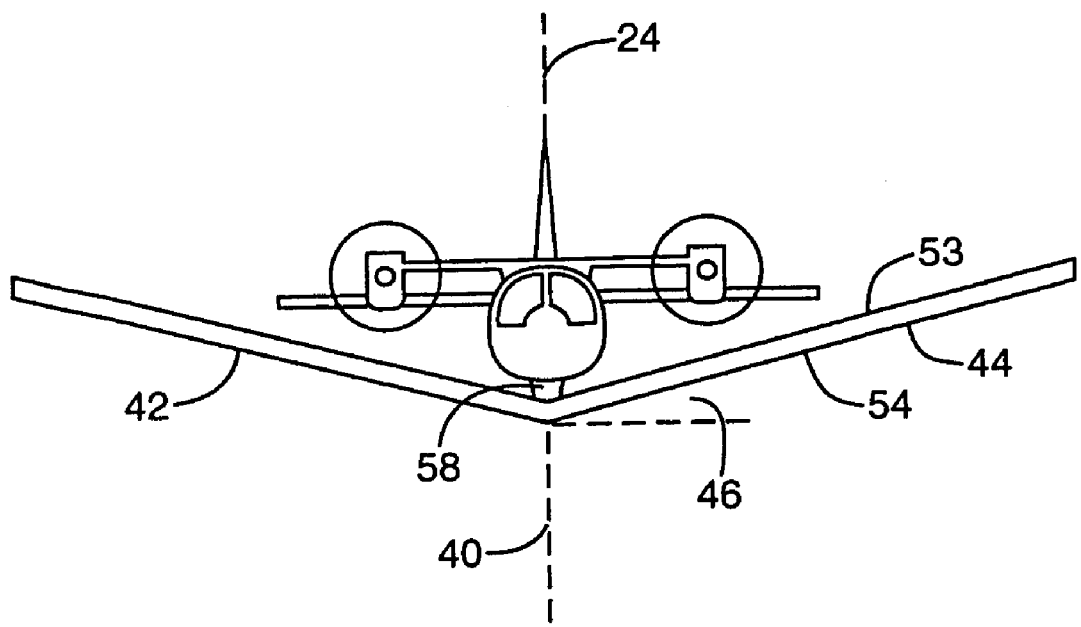
FIG. 3 is an elevation of the seaplane from the front.
Figure 4:
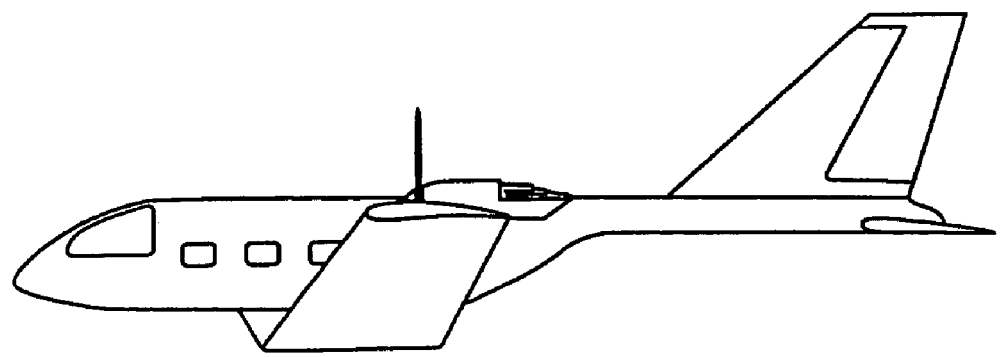
FIG. 4 is an elevation of the side of the seaplane.

With reference to FIGS. 2 and 3, the main wing 14 is dihedral and has a root 40 which is located beneath the fuselage 12 and which lies in the plane of symmetry 26 of the aircraft. The wing has distal portions 42, 44, which extend outwardly from opposite side of the root at a dihedral angle 46 of about 10 to about 20 degrees, preferably 15 degrees.

The main wing has leading and trailing edges 50, 52. The wing is a single piece which is bounded essentially by parallel upper and lower walls, 53, 54, the leading and trailing edges 50, 52 and outer edges 55, 56 at oppositely facing outer ends thereof. As such, the wing lacks aerodynamic drag-producing devices such as pontoons, wing-mounted later-stabilizing floats, specially shaped hulls and a hydrodynamic step surfaces found on the main wing of a conventional aircraft. The trailing edge of the main wing is immovable relative to its leading edge.

In some cases it may be desirable to employ aileron control surfaces at the trailing edge of the outermost portion of the main wing above the static water line.

During takeoff, the main wing is used as a surface-piercing hydrofoil to achieve a large lift force once the aircraft is underway and until hydrodynamic planing is achieved on the bottom surface of the main wing at higher speed.

With reference to FIG. 3, a pylon 58 separates the main wing from the fuselage of the seaplane. The pylon provides sufficient displacement flotation to ensure that the fuselage is out of the water when the seaplane is floating on water. The height of the pylon can of course be adjusted to ensure that the fuselage is out of water at all times and the hydrodynamic drag of the fuselage in water need not be taken into account in the design of the seaplane.

With reference to FIG. 2, each elevon 22, 24 pivots independently of the other and not together as a unit. Such elevons provide differential and non-differential water-braking to assist the execution of turns and braking to a stop for the aircraft.

The elevons also provide an alternate source of low-speed propulsion in the water to the aircraft in the case of engine failure. Such propulsion is achieved by manually causing one elevon to pivot upward and downward while at the same time causing the other to pivot in the opposite directions. Movement of the elevons in this manner produces a flipper like action in the water with resulting forward movement of the aircraft.

In traditional float-equipped seaplanes, retractable rudders are incorporated on the rear end of each float to allow steering of the craft while traveling at low speed on water. During takeoff and landing, the pilot must ensure that these rudders are in the retracted position otherwise he may lose heading control of the craft. The craft may even overturn during takeoff and landing should these rudders not be retracted at this time. My aircraft does not have this problem because the elevons are used for heading control at low speed but are completely out of the water while the aircraft is planing at high speed during takeoff and landing.

The aircraft is constructed such that its centre of gravity is located in the plane of symmetry 26 of the aircraft and vertically above the trailing edge 50 of the main wing. As a result, the centre of hydrodynamic pressure is ahead of the centre of gravity at all times thereby preventing unbalanced nose-over moments from occurring during takeoff and landing.

The main wing and horizontal stabilizer provide displacement flotation buoyancy for the aircraft while keeping the fuselage completely out of the water.

Preferably, the main wing is mounted very low and the horizontal stabilizer has a relatively large area. In such case, the seaplane will be capable of flying close to the water in ground effect and also, unlike most conventional ground effect seaplanes, be capable of climbing rapidly to and flying at high altitudes.

My seaplane can be converted to an amphibious craft by the addition of a wheel on the nose of the fuselage and wheels to the fuselage aft of the centre of gravity of the craft.

Figure 5:
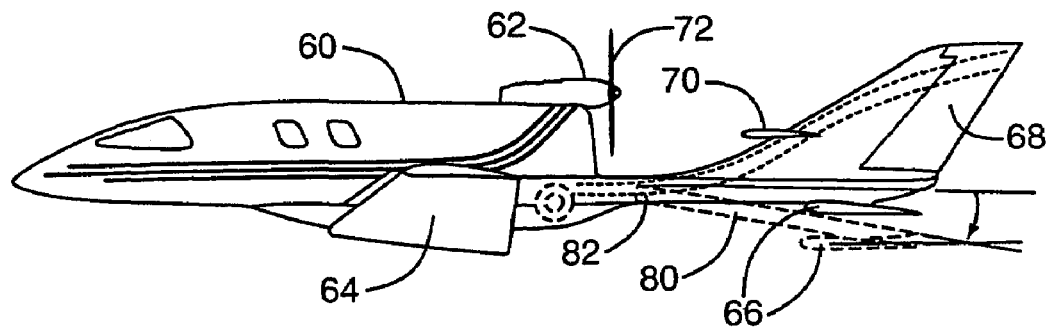
FIG. 5 is an elevation of a second embodiment of the seaplane.
Figure 6:
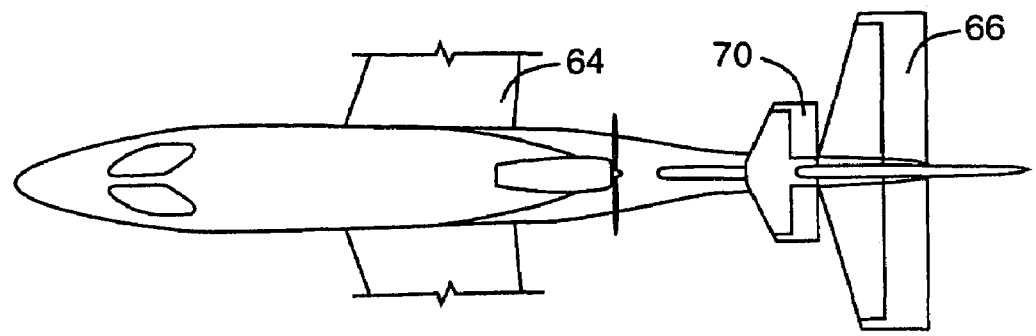
FIG. 6 is a partial plan view of the seaplane illustrated in FIG. 5.
Figure 7:
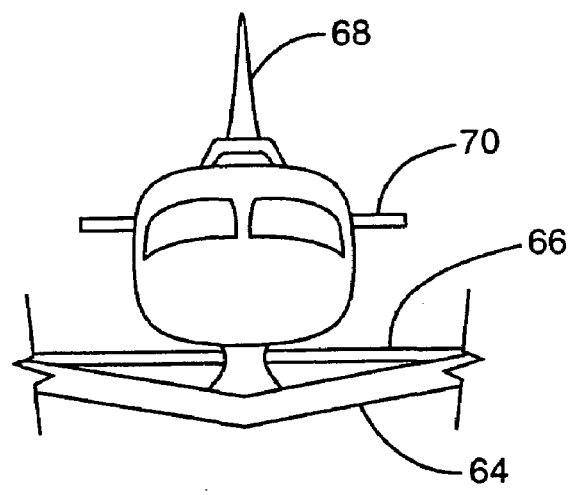
FIG. 7 is a partial front elevation of the seaplane illustrated in FIG. 5.

With reference to FIGS. 5 to 7, the seaplane has a fuselage 60 to which a single engine 62 is connected. It should be noted that a twin-engine arrangement is also possible. The aircraft has a main wing 64 and a tail having a horizontal stabilizer 66 and a vertical stabilizer 68. The structure of the wing and stabilizers is the same as the aircraft illustrated in FIGS. 1 to 4.

The aircraft of FIGS. 5 to 7 differs from the aircraft of FIGS. 1 to 4 in two respects: first, the aircraft of FIGS. 5 to 7 has a second horizontal or trim stabilizer 70. The trim stabilizer is spaced apart and above stabilizer 66 and is connected to the vertical stabilizer approximately mid-way between its upper and lower ends. The trim stabilizer extends forward of the vertical stabilizer and is immersed in the propwash of propeller 72.

The trim stabilizer is used to control the trim of the aircraft primarily during hydroplaning. The stabilizer decouples the trim function from the static flotation and elevon control functions of main horizontal stabilizer 66. This allows the latter stabilizer to be kept relatively close to the surface of the water thereby minimizing the cant angle of the craft when stationary or at rest in a static flotation mode.

The second difference between the aircraft of FIGS. 5 to 7 and the aircraft of the earlier figures is that the aircraft of FIGS. 5 to 7 has a boom 80 which is pivotally attached at 82 to the lower wall of the fuselage and which extends toward the rear of the aircraft. The main horizontal stabilizer 66 is attached to the free end of the boom.

The boom pivots from a retracted position when it is adjacent to the lower wall of the fuselage to a deployed position as illustrated in broken lines in FIG. 5. Hydraulic means (not illustrated) is used to cause the boom to pivot.

The boom allows for adjustment of the relative vertical distance between the leading edges of the main wing and the main vertical stabilizer 66. By lowering the boom so that the leading edge of the main horizontal stabilizer is below the leading edge of the main wing, the cant angle of the aircraft can be adjusted during static flotation. The cant angle of the aircraft can be adjusted to zero degrees if desired for the comfort and convenience of the passengers.

The boom would be retracted prior to the beginning of the take-off run and would only be reactivated after the craft had landed and while it was parked. Other means such as an inflatable, retractable air bladder could be used to adjust the cant angle.

Figure 8:
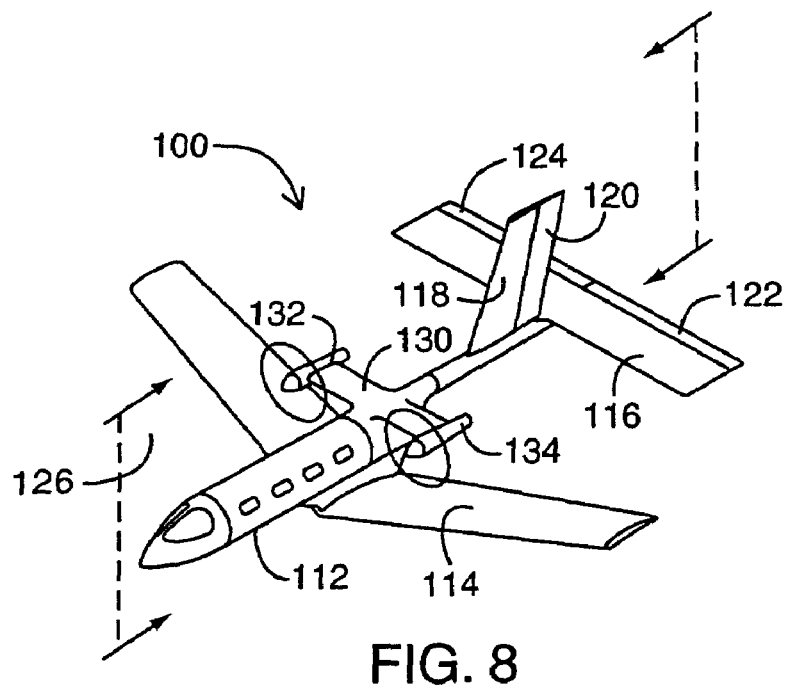
FIG. 8 is an elevation of the watercraft of my invention.

With reference to FIG. 8, the watercraft of the invention, generally 100, has a cabin 112, a main wing 114 and a tail having a horizontal stabilizer 116 and a vertical stabilizer 118. The vertical stabilizer has a rudder 120 while the horizontal stabilizer has two elevons 122,124 disposed side by side and on opposite sides of the plane of symmetry 126 of the watercraft.

Mounted on the top of the fuselage is a stub wing 130 and at the ends of the wing, engines 132, 134 are mounted. The stub wing optionally has control surfaces with blown flaps. The flaps are located in the slipstream of the propellers and serve to enhance lift of the watercraft when traveling at relatively low speed.

Figure 9:
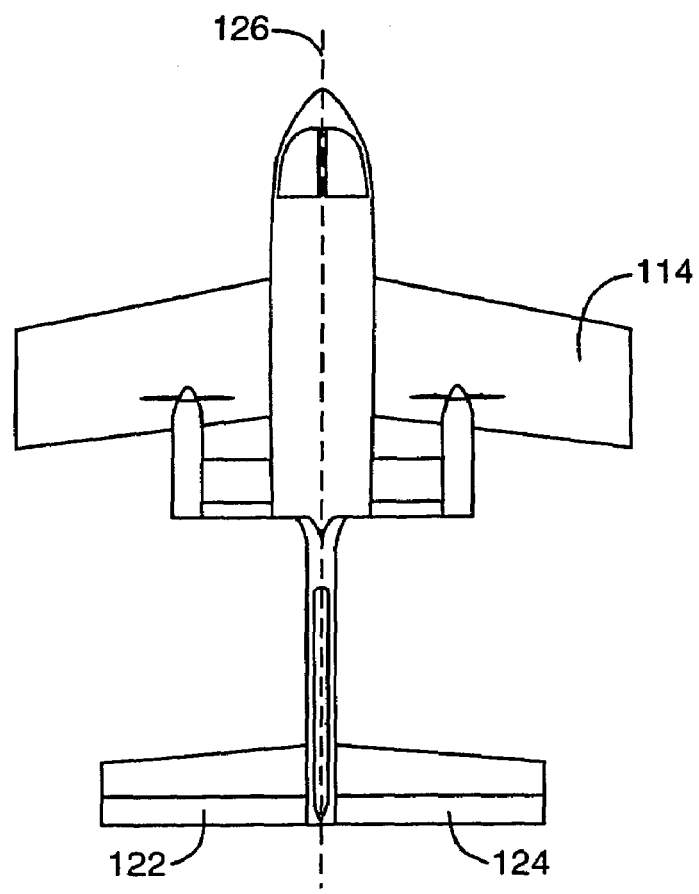
FIG. 9 is a plan view of the watercraft.
Figure 10:
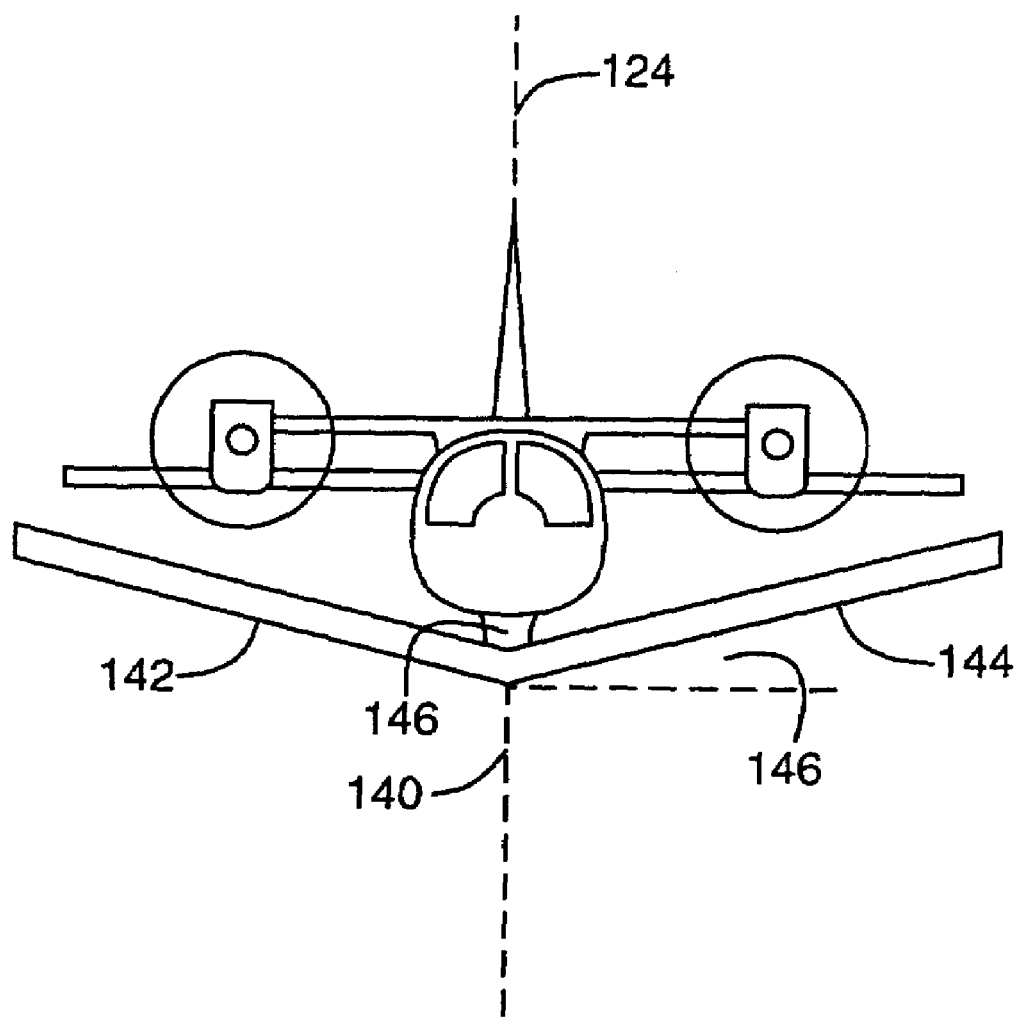
FIG. 10 is an elevation of the watercraft from the front.

With reference to FIGS. 9 and 10, the main wing 114 is dihedral and has a root 140 which is located beneath the cabin 112 and which lies in the plane of symmetry 126 of the watercraft. The wing has distal portions 142, 144, which extend outwardly from opposite side of the root at a dihedral angle 146 of about 10 to about 20 degrees, preferably 15 degrees. The wing is much shorter than the wing illustrated in FIGS. 1 and 2 so that the watercraft will not take-off when it reaches a high speed. The wing is sufficiently wide, however, to give stability to the craft when it is traveling at relatively high speeds on water.

A pylon 146 supports the cabin above the water in the same way as pylon 58 maintains the fuselage of FIGS. 1 to 7 out of the water.

The structure of the watercraft of FIGS. 8 to 10 is essentially the same as the structure of the seaplane of FIGS. 1 to 7 except, as previously mentioned, the length of the wing of the watercraft is shorter than that of the seaplane.

It will be understood of course that modifications can be made in the structure of the aircraft and watercraft of the subject invention without departing from the scope and purview of the invention, as claimed in the appended claims.

The invention claimed is:

1. A seaplane comprising
   propulsion means for propelling the seaplane;
   a main wing for providing lift while the seaplane is flying, and for providing most of the buoyancy while the seaplane is afloat and providing a hydrodynamic planing surface during landing and take-off with the trailing edge of the main wing providing a hydrodynamic step to permit the seaplane to take-off
   a tail; and
   a fuselage mounted above the main wing and extending rearwardly to the tail, at least a portion of the fuselage extending from the main wing to the tail being spaced sufficiently above the trailing edge of the main wing to prevent reattachment of water flow.

2. The seaplane as claimed in claim 1, wherein the propulsion means is located above the main wing.

3. The seaplane of claim 2, wherein the main wing has two distal portions on either side of the fuselage that meet below and without blending with the fuselage.

4. The seaplane of claim 3, wherein the two distal portions form a V-shaped dihedral angle.

5. The seaplane of claim 4, wherein the dihedral angle is about 10 to 20 degrees.

6. The seaplane of claim 3, wherein the main wing is formed as a single piece.

7. The seaplane of claim 1, further comprising a first symmetrically complete horizontal stabilizer having left and right halves in plan view, positioned on the fuselage such that it floats on the water surface to stabilize the seaplane in pitch while floating at rest on the water, wherein the first horizontal stabilizer provides additional hydrostatic buoyancy in conjunction with that provided by the main wing.

8. The seaplane of claim 7, further comprising a second, symmetrically complete horizontal stabilizer having left and right halves in plan view, separate and distinct from the first horizontal stabilizer, and positioned on the fuselage to intercept the prop-wash of the propeller for controlling the trim of the seaplane.

9. The seaplane of claim 7, further comprising a boom pivotably attached to the fuselage, wherein the first horizontal stabilizer is attached to the boom.

10. The seaplane of claim 9, wherein the boom pivots from a retracted position adjacent a lower wall of the fuselage to a deployed position.

11. The seaplane of claim 10, wherein the seaplane further includes a vertical stabilizer.

12. The seaplane of claim 10, wherein the boom allows for adjustment of the relative vertical distance between the leading edge of the main wing and a vertical stabilizer.

13. A sea-worthy airplane comprising
    a propulsion system for propelling the airplane;
    a main wing connected to the fuselage to provide lift while the airplane is in flight, and to also provide flotation to keep the fuselage substantially above water while the airplane is floating thereon, the main wing having a trailing edge that functions as a step to break suction between the water and the airplane to allow water take-off; wherein the centre of gravity thereof is located substantially at the trailing edge of the main wing root cord, the aerodynamic centre thereof is located aft of the centre of gravity and the centre of hydrodynamic pressure is located forward of the centre of gravity.

14. The sea-worthy airplane of claim 13, wherein the main wing provides most of the buoyancy that maintains said fuselage substantially above water while the airplane is afloat.

15. The sea-worthy airplane of claim 13, wherein the main wing has two distal portions on either side of the fuselage that meet below and without blending with the fuselage.

16. The sea-worthy airplane of claim 15, wherein the two distal portions form a V-shaped dihedral angle.

17. The sea-worthy airplane of claim 16, wherein the dihedral angle is about 10 to 20 degrees.

18. The sea-worthy airplane of claim 15, wherein the main wing is formed as a single piece.

19. The sea-worthy airplane of claim 13, further comprising a first, symmetrically complete horizontal stabilizer having left and right halves in plan view, positioned on the fuselage such that it floats on the water surface to stabilize the seaplane in pitch while floating at rest on the water, wherein the first horizontal stabilizer provides additional hydrostatic buoyancy in conjunction with that provided by the main wing.

20. The sea-worthy airplane of claim 19, further comprising a second, symmetrically complete horizontal stabilizer having left and right halves in plan view, separate and distinct from the first horizontal stabilizer, and positioned on the fuselage to intercept the prop-wash of the propeller for controlling the trim of the airplane.

21. The sea-worthy airplane of claim 19, further comprising a boom pivotably attached to the fuselage, wherein the first horizontal stabilizer is attached to the boom.

22. The sea-worthy airplane of claim 21, wherein the boom pivots from a retracted position adjacent a lower wall of the fuselage to a deployed position.

23. The sea-worthy airplane of claim 22, wherein the airplane further includes a vertical stabilizer.

24. The sea-worthy airplane of claim 23, wherein the boom allows for adjustment of the relative vertical distance between the leading edge of the main wing and a vertical stabilizer.

25. The sea-worthy airplane of claim 13, characterized by the absence of any further features on the fuselage functioning as a step.

* * * * *